United States Patent [19]

Kobayashi et al.

[11] Patent Number: 5,144,680
[45] Date of Patent: Sep. 1, 1992

[54] INDIVIDUAL IDENTIFICATION RECOGNITION SYSTEM

[75] Inventors: Bujirou Kobayashi; Hiroshi Gamo; Masatoshi Kimura, all of Itami, Japan

[73] Assignee: Mitsubishi Denki Kabushiki Kaisha, Tokyo, Japan

[21] Appl. No.: 622,191

[22] Filed: Dec. 5, 1990

Related U.S. Application Data

[63] Continuation of Ser. No. 328,804, Mar. 21, 1989, abandoned, which is a continuation of Ser. No. 177,824, Mar. 29, 1988, abandoned, which is a continuation of Ser. No. 834,970, Feb. 28, 1986, abandoned.

[30] Foreign Application Priority Data

Mar. 1, 1985 [JP] Japan ............... 60-40621
Jul. 31, 1985 [JP] Japan ............... 60-170143

[51] Int. Cl.⁵ ............................................. G06K 9/78
[52] U.S. Cl. .......................................... 382/4; 356/71
[58] Field of Search ............... 382/2, 4, 5, 58, 34; 356/71

[56] References Cited

U.S. PATENT DOCUMENTS

| | | | |
|---|---|---|---|
| 3,383,657 | 5/1968 | Claassen et al. | 382/4 |
| 4,186,378 | 1/1980 | Moulton . | |
| 4,210,899 | 7/1980 | Swonger et al. . | |
| 4,253,086 | 2/1981 | Szwarcbier | 382/4 |
| 4,414,684 | 11/1983 | Blonder | 382/4 |
| 4,455,083 | 6/1984 | Elmes | 382/4 |
| 4,532,508 | 7/1985 | Ruell | 382/4 |
| 4,537,484 | 8/1985 | Fowler et al. | 382/4 |
| 4,553,258 | 11/1985 | Chainer et al. | 382/3 |
| 4,582,985 | 4/1986 | Löfberg | 382/4 |
| 4,787,742 | 11/1988 | Schiller et al. | 382/5 |

FOREIGN PATENT DOCUMENTS

| | | |
|---|---|---|
| 0010611 | 9/1979 | European Pat. Off. . |
| 0043988 | 7/1981 | European Pat. Off. . |
| 1074858 | 7/1967 | United Kingdom . |
| 1150511 | 4/1969 | United Kingdom . |
| 1292646 | 10/1972 | United Kingdom . |
| 1304555 | 1/1973 | United Kingdom . |
| 1338787 | 11/1973 | United Kingdom . |
| 1506611 | 4/1978 | United Kingdom . |
| 1543602 | 4/1979 | United Kingdom . |
| 1548667 | 7/1979 | United Kingdom . |
| 2143980 | 2/1985 | United Kingdom . |

OTHER PUBLICATIONS

The International Publication 82/03286, Sep. 30, 1982.

*Primary Examiner*—David K. Moore
*Assistant Examiner*—Yon Jung

[57] ABSTRACT

An individual identification recognition system for judging whether a card possessor is an authorized card user. The system includes a card storing a fingerprint of the authorized card user, a card reader into which the card is inserted, and which reads the fingerprint of the card possessor and a judging means for judging whether a card possessor is an authorized card user based upon the result of a comparison of the fingerprint of the card possessor taken in by the card reader with the fingerprint registered in the card, which judging means can be provided in the card or the card reader.

19 Claims, 3 Drawing Sheets

INDIVIDUAL IDENTIFICATION RECOGNITION SYSTEM

This application is a continuation of application Ser. No. 07/328,804 filed on Mar. 21, 1989, now abandoned, which is a continuation of application Ser. No. 07/177,824 filed on Mar. 24, 1988, now abandoned, which is a continuation of application Ser. No. 834,970 filed on Feb. 28, 1986, now abandoned.

FIELD OF THE INVENTION

The present invention relates to a system for identifying an individual with the use of a higher level recognition method.

BACKGROUND OF THE INVENTION

A card having a magnetic stripe is widely used in systems for identifying a particular individual (The recognition card is abbreviated as an M/S card). For example, in a card to be used for a deposit or withdrawing apparatus installed in a bank (hereinafter referred to as "deposit card") there are stored a code for recognizing the genuineness of the card and a password code for judging whether a card possessor is the registered user of the card or not. Accordingly, the deposit apparatus is designed to read out the genuineness code in the card to judge whether the card is genuine or not, to instruct the card possessor to input a password code from the keyboard, and to judge whether the card possessor is an authorized card possessor or not based upon the result of comparison of the input password code with the password code registered in the card. In this system, a numeral or symbol sequence which is relatively easy to memorize is appropriate for use as a password code.

The above described method is widely used because the status of the card possessor is relatively easily judged.

However, this system has a few disadvantages as described below:

The first disadvantage arises by the fact that the password code must be memorized by the card possessor. That is, the safety against unauthorized use is inevitably lowered because a card possessor is likely to use a simple password code so as to be able to memorize it easily. However, when a complicated code such as an account number is used instead of the password code, it is very troublesome or difficult to memorize the code, and furthermore there arises an anxiety of the code being stolen. As a consequence, there results no improvement in the safety against unauthorized use.

SUMMARY OF THE INVENTION

The present invention is directed to solve the problems pointed out above, and has for its object to provide an individual identification system capable of eliminating the memorization of a password code and of enhancing the safety against unauthorized use with no anxiety of forgery.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided an individual recognition system for judging whether a card possessor is an authorized card possessor or not, comprising: a card storing a fingerprint of the registered card possessor; a card reader into which the card is inserted, and which reads the fingerprint of the card possessor; and a judging means for judging whether a card possessor is an unauthorized card possessor based upon the result of comparison of the fingerprint of the card possessor redd by the card reader with the fingerprint registered in the card, which judging means is provided in the card or the card reader.

DETAILED DESCRIPTION OF THE PREFERRED EMBODIMENTS

The present invention provides an individual identification recognition system in which a fingerprint is used instead of a password code. It is easily understood that a fingerprint is most appropriate to be used in place of a password code because it is inherent to an individual.

Figure 1:
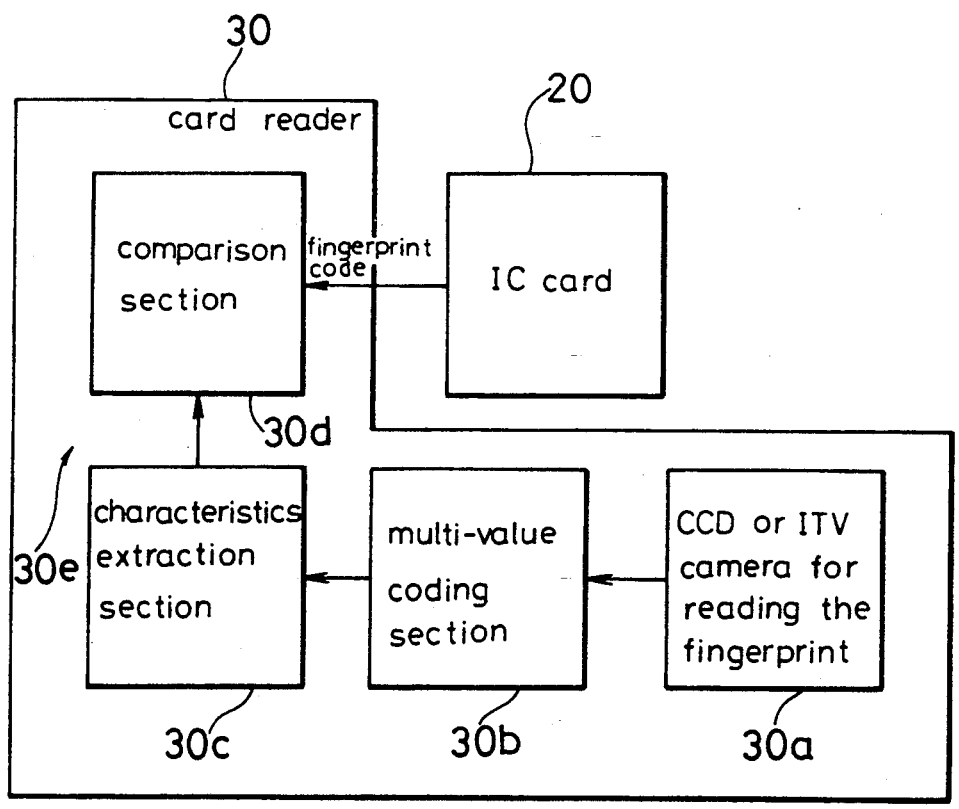
FIG. 1 is a block diagram showing a construction of an individual recognition system according to an embodiment of the present invention.

In order to explain the present invention in detail, reference will be particularly made to FIG. 1:

In the following example an IC card is used as a card storing the fingerprint. An IC card includes semiconductor elements such as a memory IC or a CPU in the card, and has a larger memory capacity than the M/S card by several columns. Furthermore, it involves desired operational functions such as characteristics extraction and comparison.

FIG. 1 is a block diagram showing an individual recognition system as one embodiment of the present invention. In FIG. 1, the reference numeral 20 designates an IC card storing the fingerprint of the card possessor as individual identification information. That is, the characteristics of the depth and interval of the fingerprint are registered in the card 20. The reference numeral 30 designates a card reader for reading out the information stored in the IC card 20 which is inserted thereinto. In the card reader 30, the reference numeral 30a designates a CCD camera or an ITV camera for reading the fingerprint from the user. The numeral 30b designates a multi-value coding section for executing a multi-value coding upon the information read by the camera 30a. The numeral 30c designates a characteristic extraction section for extracting characteristics such as the depth and the interval of the fingerprint read from the camera 30a from the output of the multi-value coding section 30b. The numeral 30d designates a comparison section for comparing the output of the characteristic extraction section 30c with the information read out from the IC card 20. As apparent from the above the characteristic extraction section 30c and the comparison section 30d constitute a judging means 30e for judging the status of the card possessor, that is, whether the possessor of the card 20 is an authorized possessor or not.

As apparent from the above, the card reader 30 has the following functions for judging the status of the card possessor:

(1) An interface function to read a fingerprint code stored in the IC card (not shown).
(2) The ability to read a fingerprint of a particular finger of a card possessor (this is accomplished by the CCD camera or ITV camera 30a and the multi-value coding section 30b).
(3) The ability to compare the two fingerprints to judge whether they are the same or not (this is accomplished by the characteristics extraction section 30c and the comparison section 30d).

Such functions are easily realized by using known methods.

Figure 2:
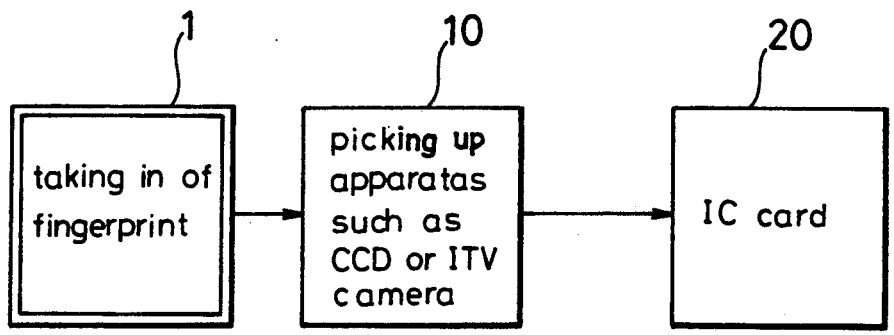
FIG. 2 is a diagram for explaining the method for taking in a fingerprint in the apparatus of FIG. 1.

The operation of the registration of the fingerprint information into the IC card 20 is described in the following:

The fingerprint of a particular finger is picked up by a camera as an image, and the image information of the fingerprint 1 is converted into an electric signal by a light-electricity conversion. A fingerprint may be alternately directly picked up by a CCD camera or an ITV camera 10. A characteristic extraction is executed on this fingerprint by a known data compressing method, and it is multi-value coded with the use of a gradation code of 6 to 8 bits for multi-value coding. Thus, the fingerprint pattern is converted into an electric signal, and the pattern code is stored in the IC card 20. Although a memory capacity of about 64K bytes is required for storing a raw fingerprint pattern, the required memory capacity can be reduced to about 1K bytes when only characteristics such as the depth and interval of the fingerprint are stored. Then, the code number of the card or the like can be stored by using the remaining memory capacity. The double rectangle in FIG. 2 is used to indicate that the content of the block is registered in the IC card 20. The same also applies to FIG. 4.

The device operates as follows:

When a card possessor inserts the IC card 20 into the card reader 30, and places a particular finger on a window for reading a fingerprint, the fingerprint of the card possessor (which is information for comparison) is picked up. The picked up signal is coded into a gradation code signal by the multi-value coding section 30b, and a characteristic extraction is executed on this signal by the characteristic extraction section 30c to be output to the comparison section 30d. In the comparison section 30d the fingerprint code read out from the IC card 20 and the extracted characteristic information are compared, a judgement is made whether the possessor of the card is the authorized card possessor.

In this embodiment having such a construction, a fingerprint is used in place of a password code, whereby the necessity of memorizing a password code such as a numerical sequence is removed, resulting in easy and convenient use. Furthermore, a fraudulent use of the card is virtually impossible, resulting in a high safety.

Figure 3:
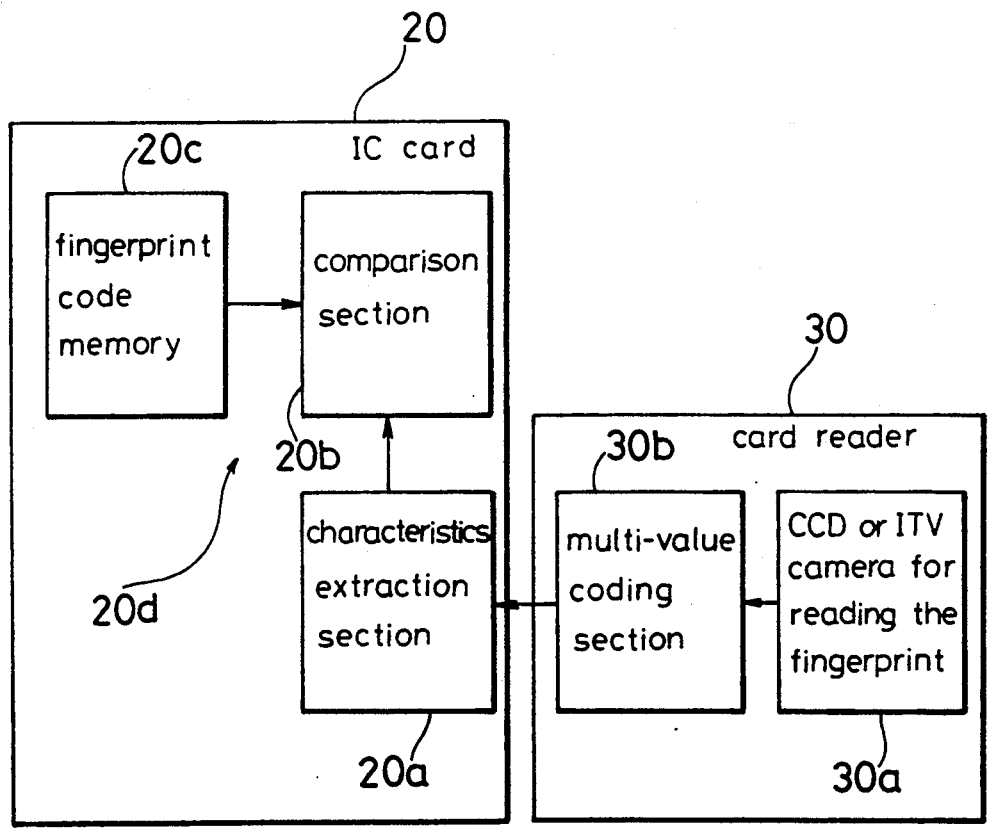
FIG. 3 is a diagram showing a construction of an individual recognition system as a second embodiment of the present invention.

FIG. 3 shows another embodiment of the present invention wherein the characteristic extraction function and the comparison function are contained in the IC card 20. In FIG. 3 the same numerals designate the same elements as those shown in FIG. 1. The reference numeral 20d designates a judging means comprising a characteristic extraction section 20a and a comparison section 20b, judging means 20d being provided in the IC card 20. The card reader 30 comprises only a CCD camera or ITV camera 30a and a multi-value coding section 30b. Herein, the numeral 20c designates a memory storing the fingerprint code.

Figure 4:
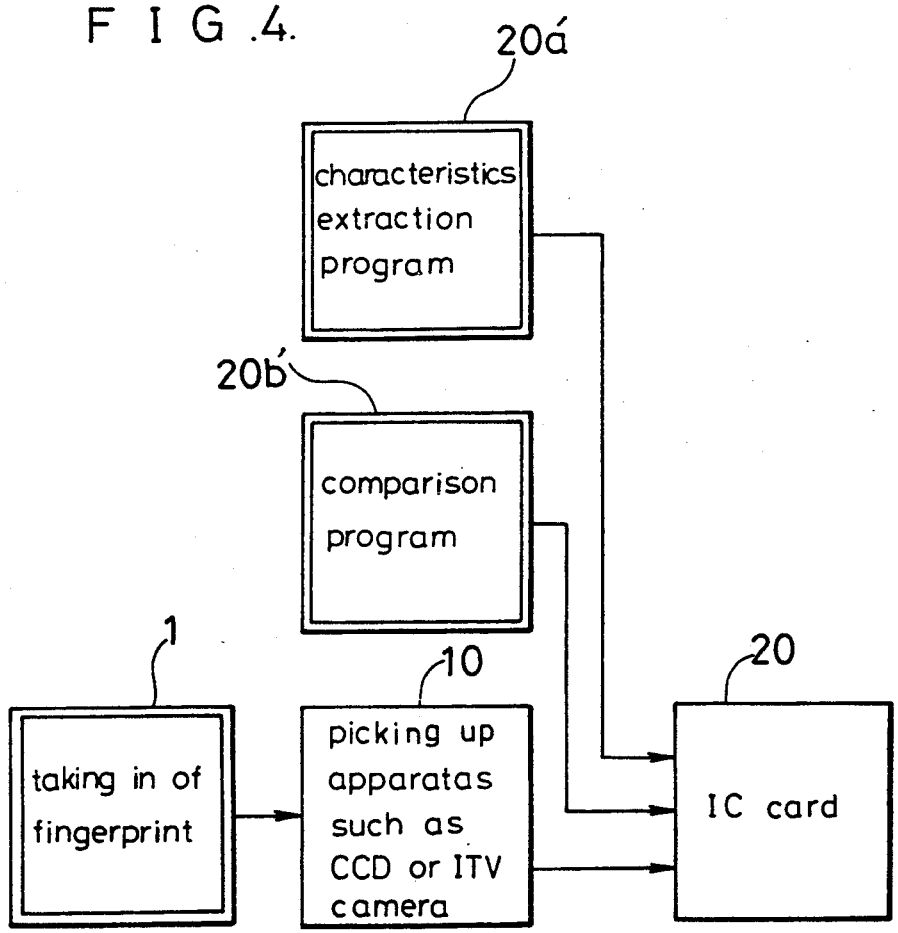
FIG. 4 is a diagram for explaining what information is stored as a registered fingerprint in the second embodiment.

In this embodiment, not only the fingerprint 1 but also a characteristic extraction program 20a' and a comparison program 20b' are contained in the IC card 20 as shown in FIG. 4, and the respective functions of the characteristic extraction section 20a and the comparison section 20b in the IC card 20 are realized by the respective programs 20a' and 20b'. Both programs 20a' and 20b' are stored with the use of the memory capacity exceeding that required for the fingerprint code.

The operation of this embodiment is substantially the same as that of the first embodiment. In addition thereto, there is no necessity of providing the characteristic extraction function and the comparison function at the card reader 30, thereby making the card reader 30 miniaturized and low cost thereby to realize a portable fingerprint comparison system.

In the illustrated embodiment a fingerprint in planar configuration is used as a fingerprint to be registered, but a fingerprint in stereoscopic configuration also be used.

Figure 5:
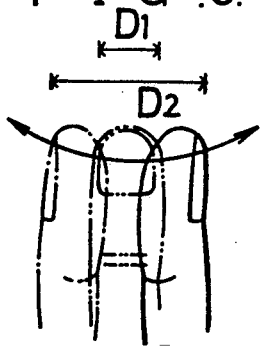
FIG. 5 is a diagram for explaining the method of taking out a fingerprint in the second embodiment.

A fingerprint in stereoscopic configuration to be registered is obtained by extending a real stereoscopic configuration of the fingerprint into a planar configuration by rotating the finger, as shown in FIG. 5. A fingerprint in stereoscopic configuration is registered into the IC card 20 in such a manner that the fingerprint obtained by the rotating method is directly picked up by a CCD or ITV camera, and a characteristic extraction is executed thereon by a known data compressing method with the use of a gradation code of 6 to 8 bits for multi-value coding. Thus, the characteristic of the fingerprint is converted into an electric signal, and this fingerprint code is stored of the memory (ROM) in the IC card 20. A memory capacity of about 64K bytes is generally required for a raw fingerprint, but it can be reduced to about 1K bytes when only the characteristics such as the depth and interval of the fingerprint are stored. Then, the code number of the card or the like can be stored in the remaining memory capacity. The rotational speed of the finger at the taking in of the fingerprint is also registered with the fingerprint information in the IC card 20.

Figure 6:
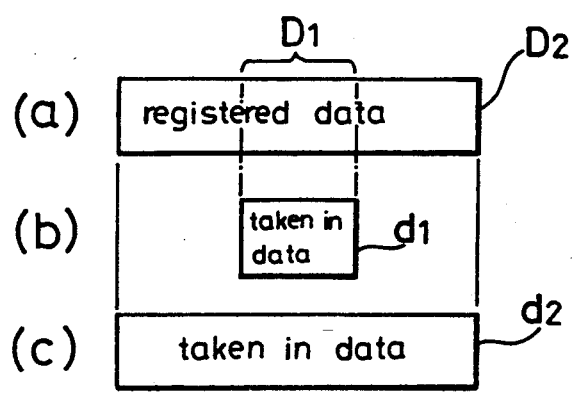
FIG. 6 is a diagram for explaining the comparison operation of the second embodiment.

This stereoscopic configuration fingerprint registered in the IC card 20 is used as in whole or a part when it is difficult to judge the status of the card possessor only on the basis of the result of comparison of the data D1 in planar configuration with the data d1 in planar configuration as the output of the characteristics extraction section 30c. In greater detail, when an identification recognition cannot be conclusively performed, as described above a fingerprint in stereoscopic configuration of the card possessor is taken in together with the rotation speed information with the use of the above described rotation method, and the extracted characteristics coded into two-values is subjected to a characteristic extraction. Then, this data d2 (refer to FIG. 6(c)) is compared with the registered data D2 in the IC card 20.

In this embodiment utilizing a stereoscopic configuration fingerprint it is more likely to prevent a fraudulent input of a fingerprint than the first embodiment utilizing a planar configuration fingerprint. This enhances the safety against unauthorized use to a great extent. Furthermore, the rotation speed information of the finger at the taking in of the fingerprint can be used in the comparison when there is a suspicion, thereby enabling correct judgment even when a stereoscopic configuration fingerprint of a registered card possessor is input under intimidation by an other person. As a result, the preciseness in the judgment about the identification of the card possessor is enhanced.

In the above illustrated embodiments IC cards are used but a laser card capable of being randomly access of reading and writing by a laser can be used.

As described above, according to the present invention, a fingerprint in planar or stereoscopic configuration is used instead of a password code, thereby resolving the disadvantages of the password method. Furthermore, forgery of a card and a fraudulent input of the fingerprint are prevented, thereby realizing a quite safe system.

What is claimed is:

1. A method of individual recognition for identifying an authorized user, utilizing a memory card and a card reader, comprising the steps of:

storing authorized user data, in a memory of the memory card, representative of specific characteristics of depths and intervals of a stereoscopic fingerprint of a finger of the authorized user and rotational speed of the finger during reading of the stereoscopic fingerprint;

coding a user stereoscopic fingerprint signal read from a fingerprint of a card user from a fingerprint reader located on the card reader, said user stereoscopic fingerprint signal including information indicative of the rotational speed of a corresponding finger of the user during reading;

transmitting said user stereoscopic fingerprint signal from the card reader to the memory card by virtue of manual manipulation of the memory card into the card reader;

extracting, within the memory card, specific characteristics of depths and intervals of the user fingerprint and the rotational speed of the corresponding finger during reading; and comparing, on the memory card, said authorized user data stored in the memory with said extracted specific characteristics and the rotational speed for developing a signal indicative of correspondence therebetween.

2. The method of individual recognition of claim 1, said coding comprising multi-valve gradation coding of 6-8 bits.

3. The method of individual recognition of claim 1, further comprising the step of storing, in the memory of the memory card, a characteristic extraction program and a comparison program.

4. A method of individual recognition for identifying an authorized user utilizing a memory card and a card reader, comprising the steps of:

storing authorized user data, in a memory of the memory card, representative of specific characteristics of depths and intervals of a stereoscopic fingerprint of a finger of the authorized user and rotational speed of the finger during reading of the stereoscopic fingerprint;

coding a user stereoscopic fingerprint signal read from a fingerprint of a card user from a fingerprint reader located on the card reader, said user stereoscopic fingerprint signal including information indicative of the rotational speed of a corresponding finger of the user during reading;

transmitting said user stereoscopic fingerprint signal from the card reader to the memory card by virtue of manual manipulation of the memory card into the card reader;

extracting, within the memory card, specific characteristics of depths and intervals of the user fingerprint and the rotational speed of the corresponding finger during reading; and comparing, on the memory card, a) the specific characteristics of depths and intervals of the authorized user data and those extracted from the user fingerprint, and b) the rotational speed of the authorized user data and that extracted from the user fingerprint to generate a signal indicative of correspondence therebetween, said comparing of the rotational speeds preventing forced manipulation of the finger of the authorized user into the fingerprint reader by an unauthorized user during a criminal act to prevent fraudulent individual recognition.

5. The method of individual recognition of claim 4, said coding comprising multi-value gradation coding of 6-8 bits.

6. The method of individual recognition of claim 4, further comprising the step of storing, in the memory of the memory card, a characteristic extraction program and a comparison program.

7. A method of individual recognition for identifying an authorized user, utilizing a memory card and a card reader, comprising the steps of:

storing authorized user data, in a memory of the memory card, representative of specific characteristics of depths and intervals of a stereoscopic fingerprint of a finger of the authorized user and rotational speed of the finger during reading of the stereoscopic fingerprint;

transmitting the authorized user data from the memory card to the card reader by virtue of manual manipulation of the memory card into the card reader;

coding a user stereoscopic fingerprint signal read from a fingerprint of a card user from a fingerprint reader located on the card reader, the user stereoscopic fingerprint signal including information indicative of the rotational speed of a corresponding finger of the user during reading;

extracting, within the card reader, specific characteristics of depths and intervals of the user fingerprint and the rotational speed of the corresponding finger during reading; and comparing, on the card reader, the authorized user data transmitted from the memory card with the extracted specific characteristics and the rotational speed for developing a signal indicative of correspondence therebetween.

8. The method of individual recognition of claim 7, said coding comprising multi-value gradation coding of 6-8 bits.

9. A method of individual recognition for identifying an authorized user, utilizing a memory card and a card reader, comprising the steps of:

storing authorized user data, in a memory of the memory card, representative of specific characteristics of depths and intervals of a stereoscopic fingerprint of a finger of the authorized user and rotational speed of the finger during reading of the stereoscopic fingerprint;

transmitting the authorized user data from the memory card to the card reader by virtue of manual manipulation of the memory card into the card reader;

coding a user stereoscopic fingerprint signal read from a fingerprint of a card user from a fingerprint reader located on the card reader, the user stereoscopic fingerprint signal including information indicative of the rotational speed of a corresponding finger of the user during reading;

extracting, within the card reader, specific characteristics of depths and intervals of the user fingerprint and the rotational speed of the corresponding finger during reading; and comparing, on the memory card, a) the specific characteristics of depths and intervals of the authorized user data and those extracted from the user fingerprint, and b) the rotational speed of the authorized user data and that extracted from the user fingerprint to generate a signal indicative of correspondence therebetween.

10. The method of individual recognition of claim 9, said coding comprising multi-value gradation coding of 6-8 bits.

11. An individual recognition system comprising:
card reader means including coding means for coding a user stereoscopic fingerprint signal read from a fingerprint of a card user from a fingerprint reader located on said card reader, the user stereoscopic fingerprint signal including information indicative of the rotational speed of a corresponding finger of the user during reading; and a memory card including a memory means for storing authorized user data representative of specific characteristics of depths and intervals of a stereoscopic fingerprint of a finger of an authorized user and rotational speed of the finger during reading of the stereoscopic fingerprint, said memory card communicable with said card reader means by virtue of manual manipulation of said memory card into said card reader means, said memory card further comprising extraction means, which receives the user stereoscopic fingerprint signal upon manual manipulation of said memory card into said card reader means, for extracting specific characteristics of depths and intervals of the user fingerprint and the rotational speed of the corresponding finger during reading, and comparison means, coupled to said memory card and said extraction means, for comparing the authorized user data stored in said memory card with the extracted specific characteristics and the rotational speed for developing a signal indicative of correspondence therebetween.

12. The individual recognition system of claim 11, said memory means also storing a characteristic extraction program and a comparison program,
the comparing of the rotational speeds preventing forced manipulation of the finger of the authorized user into said fingerprint reader by an unauthorized user during a criminal act to prevent fraudulent individual recognition.

13. The individual recognition system of claim 12, said coding means coding the user stereoscopic fingerprint signal with a multi-value gradation code of 6-8 bits.

14. An individual recognition system comprising:
a memory card for storing authorized user data representative of specific characteristics of depths and intervals of a stereoscopic fingerprint of a finger of the authorized user and rotational speed of the finger during reading of the stereoscopic fingerprint; and card reader means, communicable with said memory card by virtue of manual manipulation of said memory card into said card reader means, said card reader means comprising coding means for coding a user stereoscopic fingerprint signal read from a fingerprint of a card user from a card reader located on said card reader, the user stereoscopic fingerprint signal including information indicative of the rotational speed of a corresponding finger of the user during reading, extraction means, coupled to said coding means, for extracting specific characteristics of depths and intervals of the user fingerprint and the rotational speed of the corresponding finger during reading, and comparison means, which receives the authorized user data from said memory card upon manual manipulation of said memory card into said card reader means, for comparing the authorized user data with the extracted specific characteristics and the rotational speed for developing a signal indicative of correspondence therebetween.

15. The individual recognition system of claim 14, said coding means coding the user stereoscopic fingerprint signal with a multi-value gradation code of 6-8 bits,
the comparing of the rotational speeds preventing forced manipulation of the finger of the authorized user into said fingerprint reader by an unauthorized user during a criminal act to prevent fraudulent individual recognition.

16. A method of individual recognition for identifying an authorized user, utilizing a memory card and a card reader, comprising the steps of:
storing authorized user data, in a memory of the memory card, representative of specific characteristics of depths and intervals of a planar fingerprint and a stereoscopic fingerprint of a finger of the authorized user and rotational speed of the finger during reading of the stereoscopic fingerprint;

coding a user planar fingerprint signal and a user stereoscopic fingerprint signal read from a fingerprint of a card user from a fingerprint reader located on the card reader, the stereoscopic fingerprint signal including information indicative of the rotational speed of a corresponding finger of the user during reading;

transmitting the user planar and stereoscopic fingerprint signals from the card reader to the memory card by virtue of manual manipulation of the memory card into the card reader;

extracting, within the memory card, specific characteristics of depths and intervals of the user fingerprint from the user planar and stereoscopic fingerprint signals and the rotational speed of the corresponding finger during reading; and comparing, on the memory card, the authorized user data stored in the memory and the extracted specific characteristics for developing a signal indicative of correspondence therebetween, the authorized user data pertaining to the stereoscopic fingerprints and the rotational speed being utilized as a whole or in part when comparison of the planar fingerprints is inconclusive.

17. A method of individual recognition for identifying an authorized user, utilizing a memory card and a card reader, comprising the steps of:

storing authorized user data, in a memory of the memory card, representative of specific characteristics of depths and intervals of a planar fingerprint and a stereoscopic fingerprint of a finger of the authorized user and rotational speed of the finger during reading of the stereoscopic fingerprint;

transmitting the authorized user data from the memory card to the card reader by virtue of manual manipulation of the memory card into the card reader;

coding a user planar fingerprint signal and a user stereoscopic fingerprint signal read from a fingerprint of a card user from a fingerprint reader located on the card reader, the stereoscopic fingerprint signal including data indicative of the rotational speed of a corresponding finger of the user during reading;

extracting, within the card reader, specific characteristics of depths and intervals of the user fingerprint from the user planar and stereoscopic fingerprint signals and the rotational speed of the corresponding finger during reading; and comparing, on the card reader, the authorized user data transmitted from the memory card with the extracted specific characteristics for developing a signal indicative of correspondence therebetween, the authorized user data pertaining to the stereoscopic fingerprints and the rotational speed being utilized as a whole or in part when comparison of the planar fingerprints is inconclusive.

18. An individual recognition system comprising:

card reader means including coding means for coding a user planar fingerprint signal and a user stereoscopic fingerprint signal read from a fingerprint of a card user from a fingerprint reader located on said card reader, the stereoscopic fingerprint signal including information indicative of the rotational speed of a corresponding finger of the user during reading; and a memory card including a memory means for storing authorized user data representative of specific characteristics of depths and intervals of a planar fingerprint and a stereoscopic fingerprint of a finger of an authorized user and rotational speed of the finger during reading of the stereoscopic fingerprint, said memory card communicable with said card reader means by virtue of manual manipulation of said memory card into said card reader means, said memory card further comprising extraction means, which receives the user planar and stereoscopic fingerprint signals upon manual manipulation of said memory card into said card reader means, for extracting specific characteristics of depths and intervals of the user fingerprint thereform and the rotational speed of the corresponding finger during reading, and comparison means, coupled to said memory card and said extraction means, for comparing the authorized user data stored in said memory card with the extracted specific characteristics and for developing a signal indicative of correspondence therebetween, the authorized user data pertaining to the stereoscopic fingerprints and the rotational speed being utilized as a whole or in part when comparison of the planar fingerprints is inconclusive.

19. An individual recognition system comprising:

a memory card for storing authorized user data representative of specific characteristics of depths and intervals of a planar fingerprint and a stereoscopic fingerprint of a finger of the authorized user and rotational speed of the finger during reading of the stereoscopic fingerprint; and card reader means, communicable with said memory card by virtue of manual manipulation of said memory card into said card reader means, said card reader means comprising coding means for coding a user planar fingerprint signal and a user stereoscopic fingerprint signal read from a fingerprint of a card user from a fingerprint reader located on said card reader, the user stereoscopic fingerprint signal including information indicative of the rotational speed of a corresponding finger of the user during reading, extraction means, coupled to said coding means, for extracting specific characteristics of depths and intervals of the user fingerprint from the user planar fingerprint signal and the user stereoscopic fingerprint signal and the rotational speed of the corresponding finger during reading, and comparison means, which receives the authorized user data from said memory card upon manual manipulation of said memory card into said card reader means, for comparing the authorized user data with the extracted specific characteristics and for developing a signal indicative of correspondence therebetween, the authorized user data pertaining to the stereoscopic fingerprints and said rotational speed being utilized as a whole or in part when comparison of said planar fingerprints is inconclusive.

* * * * *